US008725062B2

(12) United States Patent
Bennett et al.

(10) Patent No.: US 8,725,062 B2
(45) Date of Patent: May 13, 2014

(54) MEDIA BROADCASTS FROM WIRELESS ACCESS POINT

(75) Inventors: James D. Bennett, San Clemente, CA (US); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 965 days.

(21) Appl. No.: 11/656,257

(22) Filed: Jan. 22, 2007

(65) Prior Publication Data

US 2008/0117852 A1    May 22, 2008

Related U.S. Application Data

(60) Provisional application No. 60/860,199, filed on Nov. 20, 2006.

(51) Int. Cl.
*H04W 4/06* (2009.01)
*H04W 48/20* (2009.01)

(52) U.S. Cl.
USPC ........... 455/3.03; 455/444; 455/561; 370/328

(58) Field of Classification Search
USPC .......... 370/312, 328; 455/443, 444, 3.03, 561
See application file for complete search history.

(56) References Cited

U.S. PATENT DOCUMENTS

| | | | |
|---|---|---|---|
| 7,103,359 B1 | 9/2006 | Heinonen et al. | |
| 7,215,959 B2 * | 5/2007 | Creamer et al. | 455/436 |
| 7,236,771 B2 * | 6/2007 | Aaltonen et al. | 455/414.1 |
| 7,269,435 B2 * | 9/2007 | Wilson et al. | 455/519 |
| 7,570,945 B2 * | 8/2009 | Lee et al. | 455/422.1 |
| 7,583,801 B2 * | 9/2009 | Terekhova et al. | 380/201 |
| 2002/0151271 A1 * | 10/2002 | Tatsuji et al. | 455/3.05 |
| 2004/0082356 A1 * | 4/2004 | Walton et al. | 455/522 |
| 2004/0229621 A1 * | 11/2004 | Misra | 455/445 |
| 2004/0264461 A1 * | 12/2004 | Janneteau et al. | 370/390 |
| 2005/0037781 A1 * | 2/2005 | Ozugur et al. | 455/458 |
| 2005/0113075 A1 * | 5/2005 | Haberman et al. | 455/414.2 |
| 2005/0114537 A1 | 5/2005 | Griswold et al. | |
| 2006/0087994 A1 * | 4/2006 | Barth et al. | 370/310 |
| 2006/0094440 A1 | 5/2006 | Meier et al. | |

(Continued)

FOREIGN PATENT DOCUMENTS

| | | |
|---|---|---|
| CN | 1846449 A | 10/2006 |
| GB | 2407456 A | 4/2005 |
| WO | 2005025247 A1 | 3/2005 |

OTHER PUBLICATIONS

European Patent Office; EP Application No. 07016874-1249; Partial European Search Report; Jul. 27, 2012; 6 pgs.

*Primary Examiner* — Steven Kelley
(74) *Attorney, Agent, or Firm* — Garlick & Markison; Jessica W. Smith (57) ABSTRACT

An integrated circuit radio transceiver and method therefore includes a wireless access point that is operable to receive media content for subsequent delivery to at least one wireless mobile terminal and to store such media content until a specified delivery time or such media content is requested. The wireless access point is operable to generate transmissions of the media content at an increased power level either directly through attached point-to-point communications that span a super service area that overlaps service areas of other wireless access points or by way of broadcast transmissions at an increased power level that overlap the service areas of other wireless access points.

20 Claims, 7 Drawing Sheets

(56) References Cited

U.S. PATENT DOCUMENTS

| | | | |
|---|---|---|---|
| 2006/0189272 A1* | 8/2006 | Willenegger et al. | 455/3.01 |
| 2007/0002796 A1* | 1/2007 | Horn et al. | 370/331 |
| 2007/0053370 A1* | 3/2007 | Aghvami et al. | 370/401 |
| 2007/0276917 A1* | 11/2007 | Sandegard et al. | 709/214 |

* cited by examiner

MEDIA BROADCASTS FROM WIRELESS ACCESS POINT

CROSS REFERENCE TO RELATED PATENTS

This U.S. application for patent claims the benefit of the filing date of U.S. Provisional Patent Application entitled, MEDIA BROADCASTS FROM WIRELESS ACCESS POINT, having Ser. No. 60/860,199, filed on Nov. 20, 2006, which is incorporated herein by reference for all purposes.

BACKGROUND

1. Technical Field

The present invention relates to wireless communications and, more particularly, to circuitry for wireless local area networks.

2. Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards, including, but not limited to, IEEE 802.11, 802.16, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of a plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via a public switch telephone network (PSTN), via the Internet, and/or via some other wide area network.

Each wireless communication device includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier stage. The data modulation stage converts raw data into baseband signals in accordance with the particular wireless communication standard. The one or more intermediate frequency stages mix the baseband signals with one or more local oscillations to produce RF signals. The power amplifier stage amplifies the RF signals prior to transmission via an antenna.

One particular device that includes such radio circuitry is the wireless access point that is operable to provide wireless access to a network such as the Internet for a wireless terminal, for example, a desktop computer with wireless radio or a wireless terminal (collectively, wireless terminal). Examples of wireless terminals with wireless radios (Bluetooth or WLAN, for example) also include laptop computers, personal digital assistants, cellular handsets having GPS based specialty application devices (e.g., mapping applications, golfing applications, fishing applications, etc.).

Typically, a wireless access point includes firewall circuitry to provide protection for the wireless terminals to prevent hackers from accessing private data within the wireless terminal. Generally, though, wireless access points support I.E.E.E. 802.11 and 802.16 protocol communications but act as a conduit for the communications between a wireless terminal and remote devices operably coupled to the wireless access point by way of a network such as the Internet. Typically, a wireless access point generates a beacon to identify itself to any wireless terminal within range of the beacon. The wireless terminal then selects an access point for attachment from all wireless access points whose beacons have been received.

Radio transceivers are currently being developed for use in many applications including use within wireless access points that are operable to establish point-to-point communications with wireless terminals. In such point-to-point communications, the wireless access point and a mobile terminal become "attached" when a communication link is established. For the purposes of transmitting and receiving data, however, the wireless access point is merely a data conduit and does not operate as a media content server. For example, a typical wireless access point is often configured to operate as a router to provide firewall protection between a network (wired and wireless) and the Internet which providing operating as a conduit between wired and wireless transmission mediums.

In a common configuration, the wireless access point is connected to a broadband modem such as a cable modem or DSL modem. Thus, a remote server often serves as a media content server and delivers the media by way of a network or physical connection through the wireless access point. For example, the wireless access point is often connected to a computer or media access server for delivery of media content to a wireless terminal. In either configuration, however, the wireless access point merely acts as a conduit.

One problem with such traditional wireless access points and associated configurations is that some communications are resource intensive and utilize significant bandwidth of the wireless access point and/or communication channels. Thus, for example, if a plurality of mobile terminals request delivery of streaming video, the wireless access point may not be able to easily satisfy all such requests. Additionally, if resource intensive types of media (e.g., streaming video) are being concurrently transmitted, communication resources for carrying voice or data may be limited thus reducing a number of users that may be serviced.

SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

A better understanding of the present invention can be obtained when the following detailed description of the preferred embodiment is considered with the following drawings, in which.

DETAILED DESCRIPTION OF THE DRAWINGS

Figure 1:
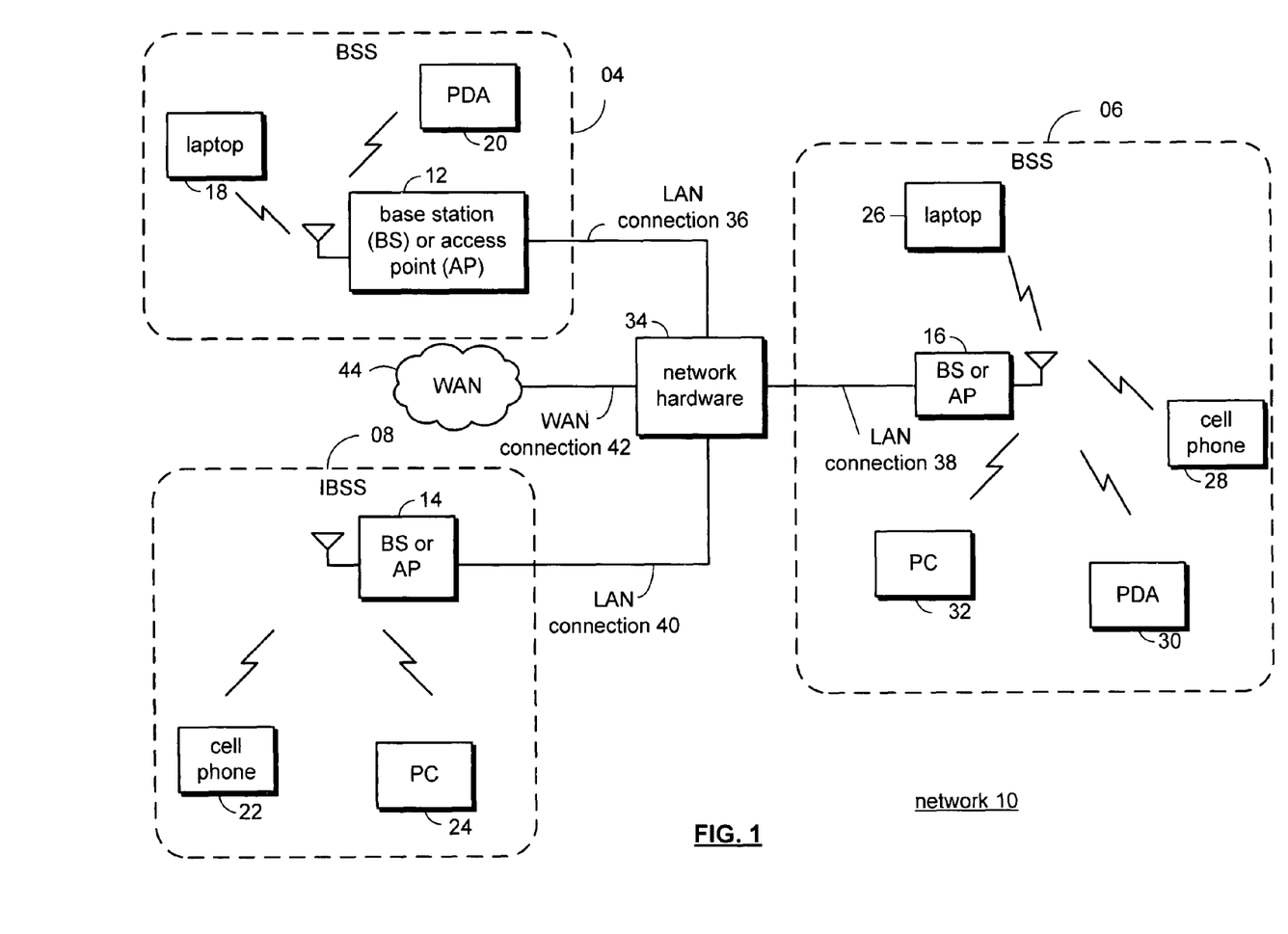
FIG. 1 is a functional block diagram illustrating a communication network that includes wireless access points operable to deliver media content according to one embodiment of the invention.

FIG. 1 is a functional block diagram illustrating a communication system that includes circuit devices and network elements and operation thereof according to one embodiment of the invention. More specifically, a plurality of network service areas 04, 06 and 08 are a part of a network 10. Network 10 includes a plurality of base stations or access points (APs) 12-16, a plurality of wireless communication devices 18-32 and a network hardware component 34. The wireless communication devices 18-32 may be laptop computers 18 and 26, personal digital assistants 20 and 30, personal computers 24 and 32 and/or cellular telephones 22 and 28.

The base stations or APs 12-16 are operably coupled to the network hardware component 34 via local area network (LAN) connections 36, 38 and 40. The network hardware component 34, which may be a router, switch, bridge, modem, system controller, etc., provides a wide area network (WAN) connection 42 for the communication system 10 to an external network element such as WAN 44. Each of the base stations or access points 12-16 has an associated antenna or antenna array to communicate with the wireless communication devices in its area. Typically, the wireless communication devices 18-32 register with the particular base station or access points 12-16 to receive services from the communication system 10. Usually, base stations are used for cellular telephone systems and like-type systems, while access points are used for in-home or in-building wireless networks. Regardless of the particular type of communication system, each wireless communication device includes a built-in radio and/or is coupled to a radio. For direct connections (i.e., point-to-point communications), wireless communication devices communicate directly via an allocated channel. For point-to-multipoint communications, e.g., broadcast communications, any one of the wireless access points may include an embodiment of the invention in which the wireless access point is operable to deliver specified content over a reserved broadcast channel according to one embodiment of the invention. Further, a wireless access point formed according to one embodiment of the invention is operable to receive and store media content for transmitting at a later time rather than operate as a mere conduit for media and other data transmissions.

Figure 2:
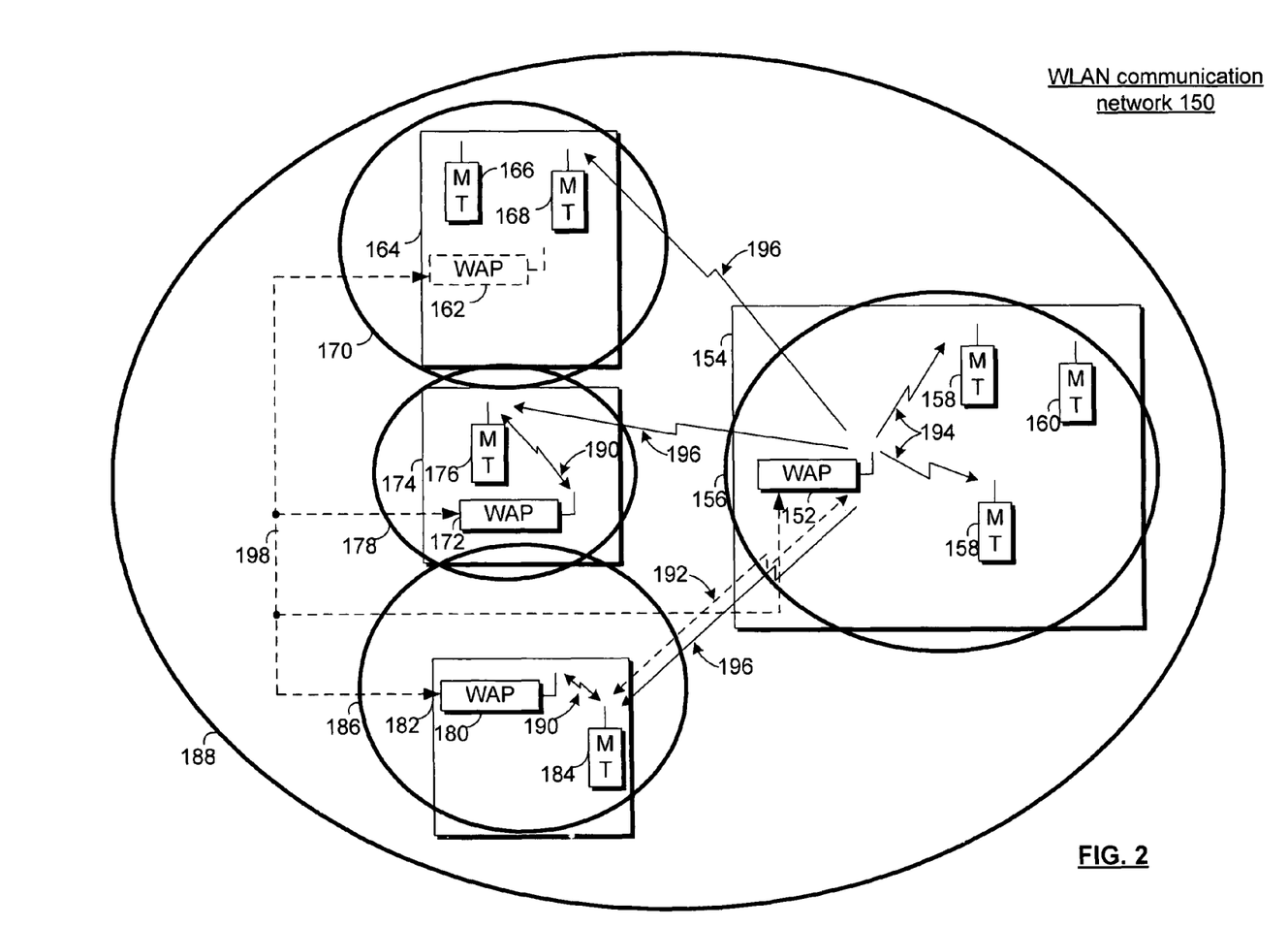
FIG. 2 is a diagram of a wireless network comprising a plurality of wireless access points and mobile terminals engaged in point-to-point and point-to-multipoint communications according to one embodiment of the present invention.

FIG. 2 is a diagram of a wireless network comprising a plurality of wireless access points and mobile terminals operating according to one embodiment of the present invention. As may be seen, a communication network 150 includes a wireless access point 152 that is located within the perimeter of a building 154. Wireless access point 152 within building 154 is operable to service point-to-point communication links within service area 156 with wireless terminals 158 and 160. A wireless access point 162 within building 164 is operable to service point-to-point communication links with wireless terminals 166 and 168 located within service area 170. A wireless access point 172 within building 174 is operable to service point-to-point communication links with wireless terminal 176 located within service area 178. Wireless access point 180 within building 182 is operable to service point-to-point communication links with wireless terminal 184 within service area 186.

Each of the service areas 156, 170, 178 and 186 are proximately located within a super-service area 188. Super-service area 188 is serviced by wireless access point 152. In one embodiment of the invention, wireless access point 152 includes a dedicated downstream wireless transceiver operable to transmit at elevated power levels to overlap service areas 156, 170, 178 and 186 to create super service area 188. In an alternate embodiment, a wireless transceiver used for servicing the super-service area is not a dedicated transceiver.

Wireless access point 152 serves mobile terminals within a service area 156. For example, as may be seen, wireless access point 152 is operable to establish point-to-point communication links with mobile terminals 158 and 160. Mobile terminals 158 and 160 generally include any mobile terminal operable to establish point-to-point links with wireless access point 152. Mobile terminals 158, however, are operable to receive point-to-multipoint transmissions, i.e., broadcast transmissions, from wireless access point 152 as well. For example, mobile terminals 158 are operable to detect, receive and process broadcast transmissions transmitted by wireless access point 152.

One aspect of the embodiments of the present invention, therefore, is that wireless access point 152 is operable to broadcast transmit stored media to a plurality of mobile terminals without specifying or identifying a particular mobile terminal. Stated differently, the transmissions are generated without being designated for a specific mobile terminal either by specifying a mobile ID or by transmitting media through established communication channels that results in a specified mobile terminal receiving the media transmission. This is in contrast to the prior art wherein media is transmitted from wireless access points to specific mobile terminals through attached communication links.

As may also be seen, a wireless access point 162 within building 164 is operable to establish point-to-point communication links with mobile terminals 166 and 168 within a service area 170. Similarly, wireless access point 172 within building 174 is operable to provide point-to-point communication services or support to mobile terminal 176 within service area 178. Wireless access point 180 within building 182 is operable to establish a point-to-point communication link with mobile terminal 184 within service area 186.

Within each of the previously described service areas, a wireless access point is operable to provide point-to-point communication services, i.e., establish point-to-point communication links, with the mobile terminals in the specified service area. Such communication links are known. In addition to the foregoing, however, each of the wireless access points is operable to provide broadcast services according to one embodiment of the present invention. Additionally, wireless access point 152 is operable to provide traditional point-to-point communication services within service area 156 and is operable to provide broadcast services (point-to-multipoint transmissions) either solely within service area 156 or within a super service area 188 which overlaps each of the service areas 156, 170, 178 and 186 in the described embodiment. Thus, another aspect of the present invention is that wireless access point 152 is operable to serve a traditional service area and is further operable to serve a super service area for specified transmissions of stored media content.

A point-to-point communication link, such as point-to-point communication link 190, may be established by a wireless access point and a mobile terminal to provide individual communication channels between a mobile terminal and an associated wireless access point. For example, wireless access point 172 is operable to provide point-to-point communication link 190 with mobile terminal 176, while wireless access point 180 provides point-to-point communication link 190 with mobile terminal 184. Each of these communication links 190 may be used for routine purposes and also to enable the mobile terminal to deliver a request for access to a broadcast transmission (reply to invitation) to the wireless access point that generated the invitation by way of a wired (backbone) network. As such, the mobile terminal is not required to generate reverse link transmissions to wireless access point 152, for example, at a power level sufficient to reach wireless access point 152. In the example embodiment of FIG. 2, a backbone network 198 provides a wired connection between each of the wireless access points 152, 162, 172 and 180. These wireless access points are operable to communicate over network 198 to provide supportive communications in relation to operation according to the various embodiments of the invention. For example, wireless access point 162, 172 and 180 are each operable to receive a reply generated from a serviced wireless terminal to an invitation from wireless access point 152 for access to a future broadcast transmission. Further, while one embodiment contemplates wireless access point 152 broadcast transmitting the invitation, an alternate embodiment includes wireless access point 152 communicating with wireless access points 162, 172 and 180 over backbone network 198 to prompt the access points to generate the invitation to each wireless terminal to which they are attached. Further, wireless access point is operable to generate access control information including encryption keys through the backbone network 198 for delivery to the wireless terminals that generated a reply to an invitation.

Point-to-point communication links 190 are established according to known I.E.E.E. 802.11a/b/g and 802.16 protocols, for example. In addition to supporting such 802.11 based communication protocols, the wireless access points according to one embodiment of the present invention, such as wireless access point 152, are operable to broadcast communication signals that are not intended for a specified mobile terminal. Stated differently, the broadcast transmissions do not include a destination identification and are not made in an established communication channel with at least one specified wireless terminal. In one embodiment, such broadcast communications are made over a reserved channel. Thus, for example, wireless access point 152 is operable to provide broadcast transmissions to any mobile terminal within super service area 188 over a specified broadcast channel.

In one embodiment of the present invention, wireless access point 152 is operable to initially establish point-to-point communication links with mobile terminals to provide access control information, i.e., access control information, for a future broadcast transmission. In the example shown, wireless access point 152 initially establishes point-to-point communication link 192 with mobile terminal 184 of service area 186 to provide an encryption key to mobile terminal 184 to enable mobile terminal 184 to receive and decipher the future broadcast transmission.

Similarly, though not shown here, wireless access point 152 is operable to establish a point-to-point communication link with each mobile terminal seeking access to the future broadcast transmission. Because, as is suggested by the example of FIG. 2, the service areas of the mobile terminals are outside of the building 154 that hosts wireless access point 152, wireless access point 152 as well as each mobile terminal in service areas 170, 178 and 186 seeking to communicate with wireless access point 152 over a point-to-point communication link, must transmit at increased power levels to wireless access point 152.

Similarly, wireless access point 152 is operable to transmit to each of those mobile terminals at an increased power level to deliver, for example, the encryption key to enable the mobile terminals to decipher the future broadcast transmission if such information is to be transmitted over an attached wireless communication link.

In an alternate embodiment of the invention, the wireless access points are operable to provide an indication to wireless access point 152 over a wired backbone network, such as the Internet, or an intranet, to advise wireless access point 152 of an ID and location of each local mobile terminal seeking access to the broadcast transmission. In this embodiment, only wireless access point 152 transmits the point-to-point communication signals over communication link 192 at an increased power level sufficient to enable the remote mobile terminals from other service areas to receive the access control information to properly decrypt the future broadcast transmission. In this embodiment, the mobile terminals outside of the service area of wireless access point 152, i.e., service area 156, utilize backbone network 198 connected between wireless access point 152 and an associated wireless access point to which the mobile terminal is attached to provide necessary information to wireless access point 152 to facilitate wireless access point 152 providing access control information to process at least one future broadcast transmission. Thus, after such point-to-point communications over communication link 192 are complete sufficient to enable the mobile terminals to receive and decipher encrypted media, wireless access point 152 is operable to broadcast transmit the specified media as broadcast transmissions 194 and 196.

In the event that the broadcast transmissions are only to mobile terminals within service area 156 of wireless access point 152, the broadcast transmissions 194 are generated at a routine power level appropriate for servicing mobile terminals only within service area 156. For example, if wireless access point 152 evaluates an ID of the mobile terminals that replied to an invitation for a broadcast transmission and determined that those mobile terminals were mobiles that had been or were attached to wireless access point 152 within service area 156, there is no need for the broadcast transmission to be at an increased power level that overlaps other service areas.

If, on the other hand, at least one mobile terminal that is to receive the broadcast transmission is not a mobile terminal that is within service area 156 (as determined by reviewing attachment or by reviewing location information provided by the mobile terminal), wireless access point 152 is operable to transmit broadcast at an increased power level to serve mobile terminals within super service area 188.

In alternate embodiments of the invention, wireless access point 152 does not address billing issues or provide access control information. In these embodiments, the user of the mobile terminal manually enters encryption information without interacting with wireless access point 152. For example, the user of the mobile terminal communicates with a remote server to gain access to encrypted media transmission in exchange for a payment wherein the control access information is either for a single media transmission or for a plurality of transmissions within a specified period.

In summary, wireless access point is operable to generate an invitation to receive the broadcast transmission either by way of a broadcast transmission, an attached communication (directly to the wireless terminal), or through another wireless access point by way of a backbone network. The wireless access point is further operable to receive replies to an invitation by way of an attached communication with a down stream wireless transceiver or by way of the backbone network through an upstream transceiver for wired communications.

Figure 3:
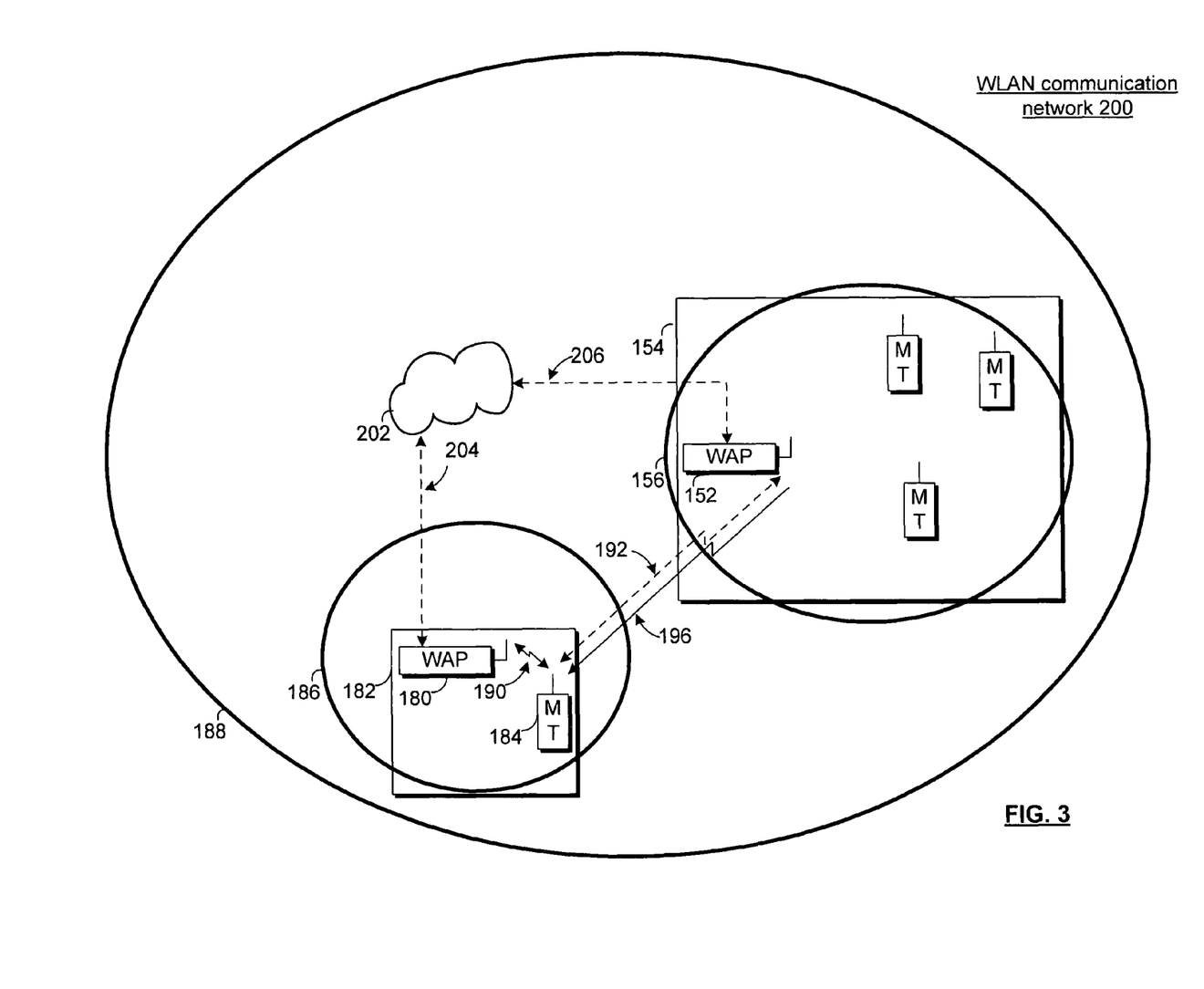
FIG. 3 is an exemplary diagram of a wireless communication network and the transmission paths for control communications to facilitate broadcast transmissions according to one embodiment of the present invention.

FIG. 3 is an exemplary diagram of a wireless communication network operating according to one embodiment of the present invention. As may be seen, from examining network 200, substantial similarity exists with network 150, although network 200 shows only a portion of network 150. Thus, common parts are given common reference numerals. Operation of these parts is largely as described before. As may be seen, however, network 200 also includes an illustration of a backbone network 202 that comprises one of the Internet or an intranet through which wireless access points communicate to facilitate operation according to one embodiment of the present invention.

More specifically, wireless access point 180 is operable to communicate with wireless access point 152 by way of a network 202 wherein wireless access point 180 is coupled to network 202 by way of wired communication link 204, while wireless access-point 152 is connected to network 202 by wired communication link 206. In operation, wireless access point 152 generates a broadcast transmission to invite any mobile terminal within super service are 188 to respond if the user of that mobile terminal wishes to receive a future broadcast transmission.

In the described embodiment, for example, mobile terminal 184 is operable to communicate with wireless access point 180, with which it has an established point-to-point communication link 190, to indicate to wireless access point 180 that it wishes to receive the broadcast transmission from wireless access point 152. As such, wireless access point 180 communicates with wireless access point 152 via network 202 to indicate to wireless access point 152 that mobile terminal 184 wishes to receive the future broadcast transmission. Wireless access point 180 provides location information to wireless access point 152 and/or an identity of mobile terminal 184. Thereafter, wireless access point 152 transmits access control information to mobile terminal 184. In the described embodiment, wireless access point transmits the access control information by way of backbone network 202 to wireless access point 180 for delivery to wireless terminal 180 by way of an attached communication link 190.

In an alternate embodiment, the point-to-point communication link with mobile terminal 184 is a hybrid point-to-point communication link, in that the responses for mobile terminal 184 are conducted to wireless access point 152 through wireless access point 180 via network 202. Forward-link transmissions from wireless access point 152 to mobile terminal 184 are wireless point-to-point transmissions. In one embodiment, these transmissions are at an increased power level. In an alternate embodiment of the invention, mobile terminal 184 responds to wireless access point 152 wirelessly over increased power level point-to-point communication signals also. With each of these approaches, once wireless access point 152 has transmitted to wireless terminal 184 the required access control information to properly process the future broadcast transmission, wireless access point 152 is operable to generate the broadcast transmissions (or, alternatively, point-to-point media transmissions) to be received by mobile terminal 184.

Figure 4:
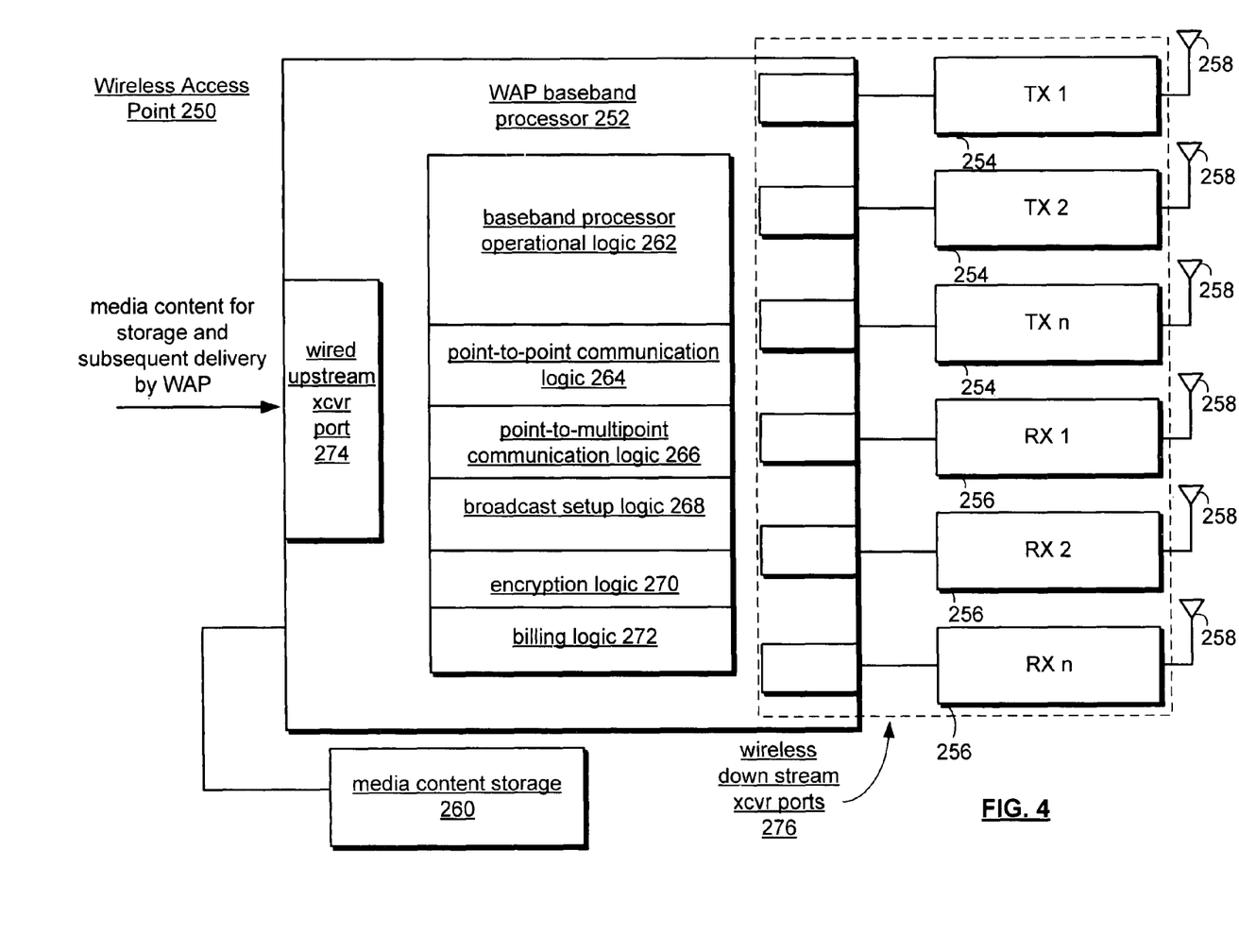
FIG. 4 is a functional block diagram of a wireless access point according to one embodiment of the present invention that may be used in conjunction with any of the embodiments of the invention shown in FIGS. 1-3 among other embodiments.

FIG. 4 is a functional block diagram of a wireless access point according to one embodiment of the present invention. A wireless access point 250 includes a wireless access point baseband processor 252 operably coupled to a plurality of transmit circuits 254 for downstream transmissions to wireless terminals and to a plurality of receive circuits 256 for receiving downstream transmissions from wireless terminals. Baseband processor 252 is further coupled to an upstream transceiver 274 for wired communications over a backbone network. Baseband processor 252 is further operably coupled to media content storage 260 for storing media content received through a downstream wireless transceiver or through the upstream wired transceiver 274 as shown in the example of FIG. 4. Media content storage 260 may be any type of storage device including hard drive and optical storage devices and memory structures of all types. As may be seen, wireless baseband processor 252 includes a plurality of wireless down stream transceiver ports 276 operatively coupling communications between baseband processor 252 and transmit and receive circuits 254 and 256, respectively.

Baseband processor 252 transmits outgoing communication signals to one or more radio front end transmit circuits 254 and receives ingoing communication signals from one or more radio front end receive circuits 256. The transmit circuits 254 and receive circuits 256 are operably disposed to transmit and receive radio frequency signals over one or more antennas 258. In the described embodiment of the invention, each transmit and receive circuit is coupled to its own antenna. In other embodiments, however, a lesser number of antennas may be coupled to the circuits 254 and 256 by way of switching circuitry.

As may be seen, wireless access point baseband processor 252 is coupled to a media content storage 260, which is for storing media content received either wirelessly or through a wired backbone network. Generally, storage 260 is for storing received media content until a specified time or request is received for delivery of at least a portion of the stored media content within storage 260. For example, a specified schedule of movies may be used to trigger broadcast transmissions. In either case, wireless access point 250 is operable to transmit control access information for a specific broadcast or, alternatively, control access information that would allow decryption for a specified period.

Baseband processor 252 operates according to logic defined within memory in the form of computer instructions, which instructions are executed by the baseband processor. The logic may be defined in firmware and/or associated memory which provides the computer instructions to the baseband processor and includes logic to operate according to each of the described embodiments of the invention. Generally, however, the logic includes baseband processor operational logic 262, point-to-point communication logic 264, point-to-multi-point communication logic 266, broadcast setup logic 268, encryption logic 270, and billing logic 272. The aforementioned logic enables the wireless access point 250 to operate as described herein. For example, the point-to-point communication logic 264 enables the wireless access point 250 to establish routine point-to-point communication links between wireless access point 250 and a mobile terminal within a service area served by wireless access point 250.

Point-to-multipoint communication logic 266, on the other hand, defines instructions and logic for broadcast transmissions of stored media content within media content storage 260. For example, in one embodiment, at least one channel is reserved for broadcast transmission of such media. The term channel, however, is used in a manner that includes OFDM transmissions simultaneously from a plurality of transmit circuits to achieve high data rate transmissions.

The logic further includes broadcast setup logic 268 which, for example, includes delivery of access control information to remote mobile terminals either within an immediate service area or within a super service area to enable the mobile terminal to receive and process the broadcast transmissions. Specifically, such broadcast setup access control information includes an encryption key to enable the mobile terminal to decrypt the broadcast transmissions (or point-to-point transmissions of media content). The logic also includes encryption logic 270 for encrypting the broadcast transmissions and billing logic 272 for generating billing information that identifies mobile terminals that were provided access to the broadcast transmissions.

Each downstream transceiver of wireless access point 250, ie., an output port and corresponding transmit circuit 254 or input port and corresponding receive circuit 256, is operable to support or service wireless communications with a wireless terminal. Moreover, according some communication protocols such as OFDM, a plurality of transceiver ports may be used to support or service a communication link with a single wireless transceiver.

Figure 5:
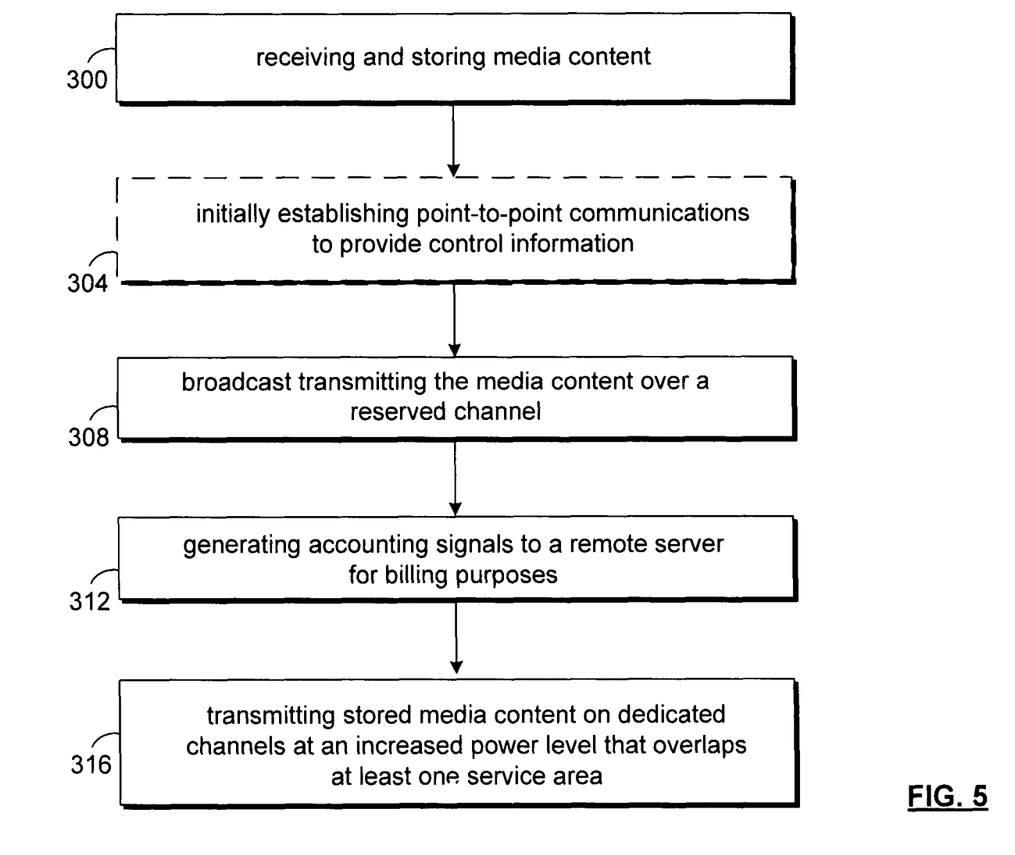
FIG. 5 is a flow chart illustrating a method for wireless broadcast transmissions from a wireless access point over a reserved channel for delivering stored stored media content according to one embodiment of the present invention.

FIG. 5 is a flow chart illustrating a method according to one embodiment of the present invention. The method of FIG. 5 includes initially receiving and storing media content transmitted to the wireless access point for storage and subsequent delivery (step 300). Thereafter, the method optionally includes initially establishing point-to-point communications with at least one wireless mobile terminal to receive mobile terminal information and to provide access control information to the mobile terminal to enable the mobile terminal to receive and process subsequent broadcast transmissions (step 304). In one embodiment, this step includes receiving sufficient identifying information to facilitate the user of the mobile terminal being billed for the access to the transmitted media content. In alternate embodiments, the wireless access point is operable to receive and process prepaid account information or credit card information wherein, typically, a third party pays the operator of the wireless access point in relation to a pre-paid account, credit card account or other financial account.

Thereafter, the method includes broadcast transmitting the media content over a specified channel without specifying single or multipoint destinations for the broadcast transmissions (step 308). In one embodiment, this specified channel is a reserved channel that is reserved for delivery of media content, and more particularly, for delivery of the broadcast transmission that include or relate to the delivery of the media content, such as invitations to receive the media content in addition to the media content itself.

Typically, a wireless access point establishes a communication link with a mobile terminal that is dedicated and used only by the wireless access point and the mobile terminal. As such, any transmission by the wireless access point is intended for, and dedicated to, the mobile terminal with which the point-to-point communication channel has been established. Thus, the method includes transmitting media on a specified or reserved broadcast channel that is not transmitted directly to a specified mobile terminal. In other words, the transmission is not through an attached communication link and/or does not specify a destination device ID of any type in association with the broadcast media.

Thus, any mobile terminal may readily scan the channel to receive the broadcast transmission. As will be described in greater detail below, however, such broadcast transmissions may be encrypted and may require delivery of access control information including an encryption key or other information necessary to process the protected media. This access control information is delivered to the mobile terminals prior to the broadcast transmission to enable such mobile terminals to receive and decipher the encrypted broadcast transmission.

The method further includes generating accounting signals to a remote server for billing purposes to result in the user of the mobile terminal to be billed or for payment purposes (e.g., pre-paid, credit card or other financial accounts) for each wireless terminal that was given access to the broadcast transmissions (step 312). In one embodiment of the invention, point-to-point communications are established with each mobile terminal seeking access to the broadcast transmissions to give the mobile terminals access control information prior to a broadcast transmission of the stored media content. Accordingly, the wireless access point generates accounting signals to a remote server for each mobile terminal that was given such access control information (e.g., an encryption key to enable it to decrypt the broadcast transmissions).

Finally, the method includes broadcast transmitting the stored media content on the reserved or broadcast channel, which may comprise a plurality of dedicated physical channels, at an increased power level that overlaps at least one service area of another wireless access point (step 316). One aspect of the embodiments of the present invention is that the wireless access point is operable to serve a super service area that overlaps service areas of other wireless access points wherein the super service area is only for the delivery of broadcast transmissions. In an alternate embodiment, however, a point-to-point communication channel may be used if a limited number of mobile terminals are to receive a specified media though this point-to-point communication channel.

The point-to-point communication channel (attached communication link) may still be at an increased power level to a terminal in a service area of another wireless access point or may be through a reserved channel wherein each of these transmissions is for the purpose of delivering stored media content. The wireless access point is operable to evaluate the number of mobile terminals that are to receive the media content as a part of determining whether to broadcast transmit the media or whether to transmit the media through a point-to-point communication link. For example, if the media is a stored song (e.g., an MP3 or WAV music file) or if only one or two mobile terminals have accepted an invitation for a particular showing of a movie, the wireless access point may determine that a point-to-point transmission may be preferred to save the broadcast channel for possible future use (for example, before the current media content is through being delivered).

Figure 6:
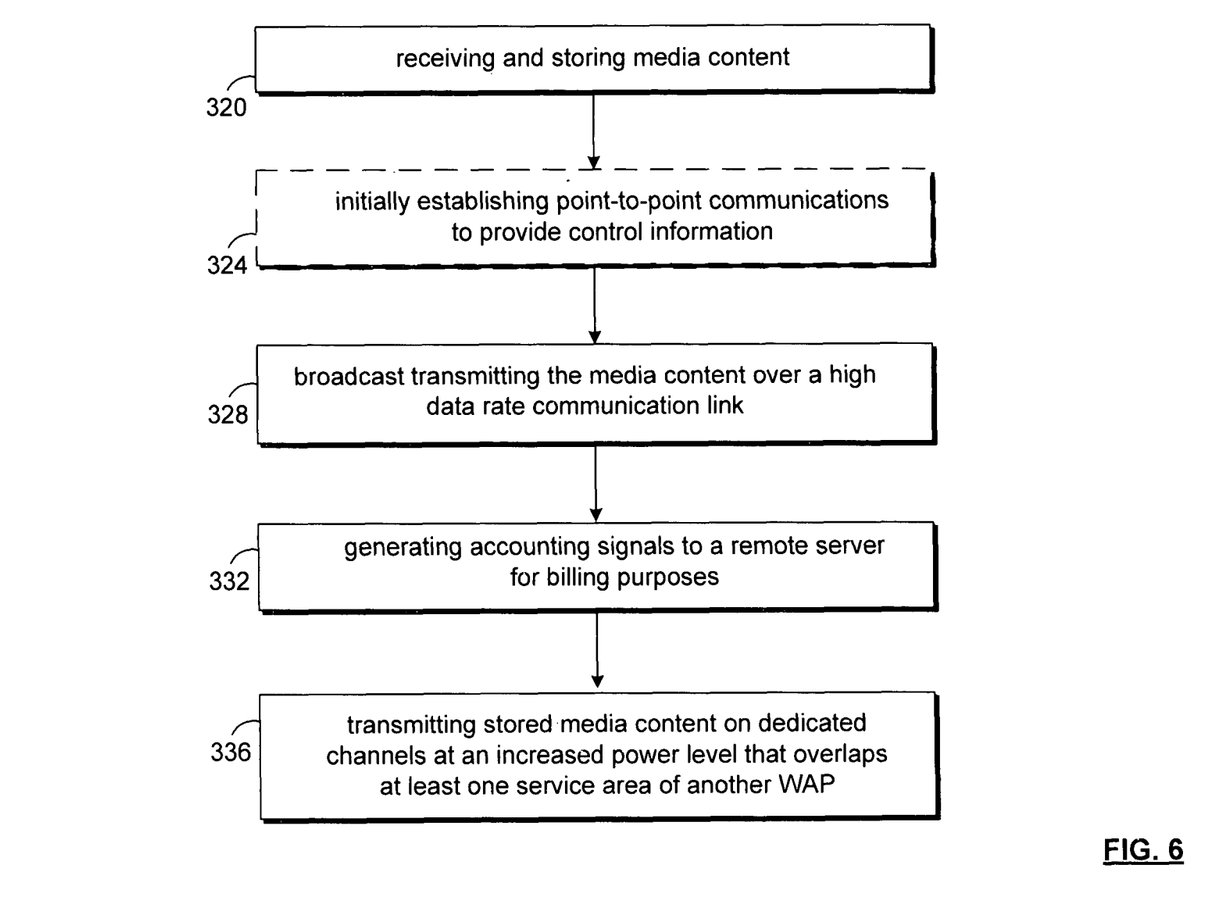
FIG. 6 is a flow chart of a method for wireless broadcast transmissions from a wireless access point utilizing high data rate communication channels for delivering stored media content according to one embodiment of the present invention.

FIG. 6 is a flow chart illustrating an alternate method according to one embodiment of the present invention. The method of FIG. 6 includes initially receiving and storing media content transmitted to the wireless access point for storage and subsequent delivery (step 320). Thereafter, the method optionally includes initially establishing point-to-point communications with at least one wireless mobile terminal to provide access control information to the mobile terminal to enable the mobile terminal to receive and process subsequent broadcast transmissions (step 324). The method further includes broadcast transmitting the media content over a high data rate communication link comprising at least one of a high order constellation encoding format or a plurality of communication channels (step 328). Specifically, this step contemplates utilizing higher order constellation encoding formats, such as 8-PSK, 16-PSK, 64-PSK, 128-PSK or 256-PSK, for example.

Additionally, the embodiments of the invention may include using Orthogonal Frequency Division Multiplexing (OFDM) to transmit a communication signal over a plurality of antennas to increase the overall data rate. Referring, for example, to FIG. 4, two or more transmitter circuits may be utilized to collaboratively transmit data from a high data rate application, such as streaming video. Accordingly, multiple in multiple out (MIMO), multiple in single out (MISO), single in multiple out (SIMO), and single in single out (SISO), communication transceivers may be employed for delivering media.

In one embodiment, therefore, the media is transmitted using OFDM transmission techniques over a plurality of antennas from a plurality of transmit circuits to increase data rates to support high resolution real time video, for example. As such, if a wireless access point receives and stores media content, and then subsequently broadcast transmits the media content to one or more mobile terminals, the wireless access point may use these high data rate communication techniques to provide adequate data at an adequate rate for enjoyment by the users of the mobile terminals. The method also includes generating accounting signals to a remote server for billing/payment purposes as described before for each wireless terminal given access to the broadcast transmissions (step 332). The method also includes transmitting the stored media content on at least one dedicated channel, and, optionally, at an increased power level that overlaps at least one service area of another wireless access point (step 336).

Figure 7:
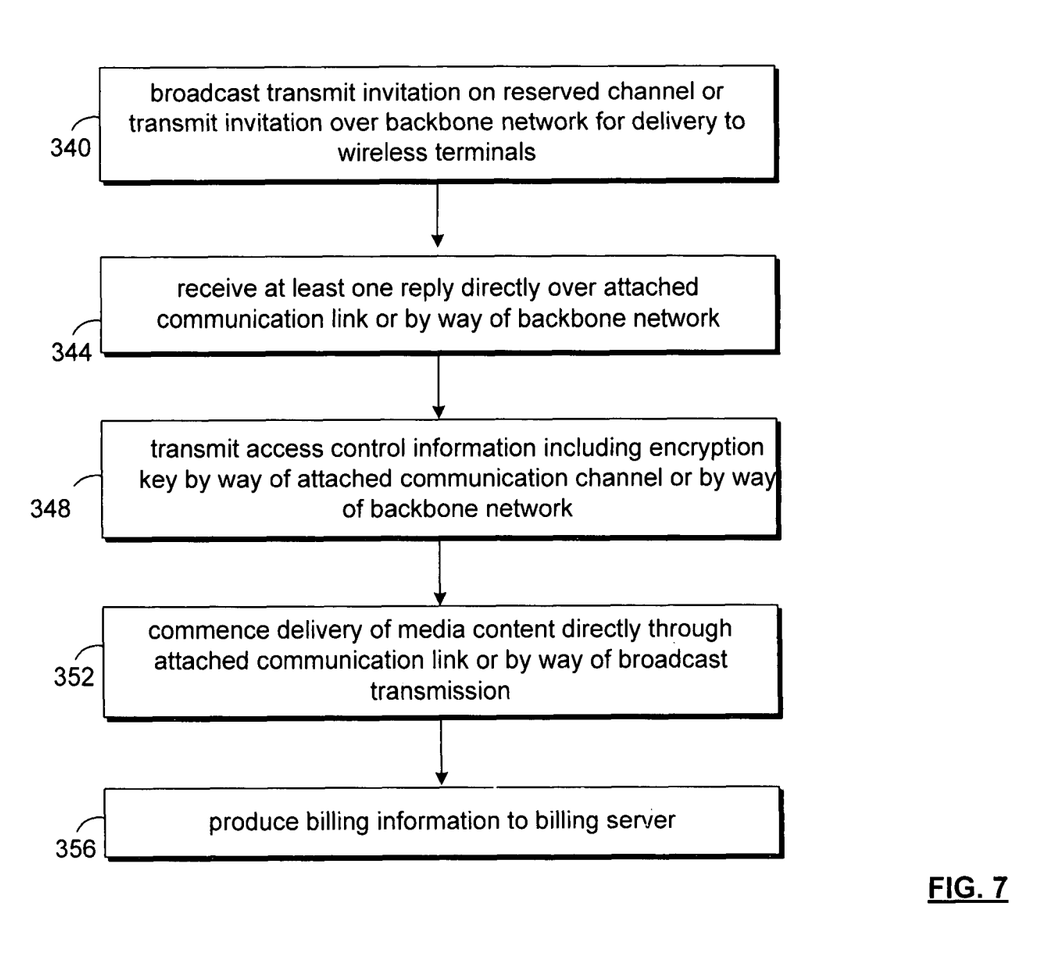
FIG. 7 is a flow chart of a method according to one embodiment of the invention for establishing broadcast transmissions in a super service area by a wireless access point according to one embodiment of the present invention.

FIG. 7 is a flow chart that illustrates a method according to one embodiment of the present invention for broadcast transmissions by a wireless access point. The method includes a super service area wireless access point broadcast transmitting an invitation on a reserved channel or, alternatively, transmitting an invitation to at least one of a plurality of wireless access points over a wired backbone network for delivery to attached terminals (step 340). The invitation is an invitation to request access to a future broadcast transmission or for any stored media including music files. As such, this method step contemplates either wirelessly broadcast transmitting an invitation over a super service area wireless transmission or using a backbone network to communicate with individual wireless access points to prompt those wireless access points to process and generate the invitation for a future broadcast media transmission to attached mobile terminals through point-to-point communications between the wireless access points and the attached mobile terminals.

Thereafter, the super service area wireless access point receives at least one reply from a terminal, which reply is received directly over an attached communication link transmitted at an increased power level or by way of the wired backbone network from a wireless access point attached to the terminal (step 344). The super service area wireless access point then transmits access control information including an encryption key to the at least one terminal by way of the attached communication at the increased power level or by way of the wireless access point attached to the terminal through the backbone network (step 348). Thereafter, the super service area wireless access point commences delivery of the media content directly through an attached communication link at an increased power level or by way of a broadcast transmission on a reserved channel at an increased power level (step 352). Finally, the method includes the super service area wireless access point producing billing information to a billing server (step 356).

One aspect of the method of FIG. 7 is that the super service area wireless access point that is to transmit the media content is operable to establish an attached communication link over the super service area with remote mobile terminals wherein the attached communications occur at an increased power level. As such, through the attached communications, the super service area wireless access point is operable to receive a response to an invitation for the media content as well as to provide access control information regarding the media content that is to be transmitted.

The access control information may also be delivered from the super service area wireless access point through a backbone network to a wireless access point that may become attached to the mobile terminal seeking access to the media content once the media content is transmitted. The embodiment of the invention described herein also includes the super service area wireless access point delivering the media content either directly through an attached communication link or through a broadcast transmission on a reserved channel. Generally, the use of the backbone network and other wireless access points to communicate with any mobile terminal in the super service area facilitates two-way communications at regular transmission power levels instead of requiring the mobile terminal to transmit at an increased power level that would reach the wireless access point at a distant location within the super service area.

Finally, each of the method steps of FIG. 5-7 may be modified for transmissions solely within a single wireless access point service area by the wireless access point that provides wireless communication services within the service area. The method steps in a super service area are one embodiment of the present invention, but the teachings of the present invention are not to be limited to services provided only within super service areas of wireless local area network service areas.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled".

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but, on the contrary, the invention is to cover all modifications, equivalents and alternatives falling within the spirit and scope of the present invention as defined by the claims. As may be seen, the described embodiments may be modified in many different ways without departing from the scope or teachings of the invention.

The invention claimed is:

1. A wireless access point, comprising:
   a media content storage device for storing media content for delivery as streaming media;
   wireless transceiver circuitry for transmitting and receiving wireless communication signals to and from at least one mobile terminal located within a service area supported by the wireless access point; and
   wherein the wireless access point is configured to:
      retrieve the media content from the media content storage device;
      when a request is received for streaming media from the at least one mobile terminal within a service area supported by the wireless access point, the wireless access point is configured to broadcast transmit the streaming media from the wireless transceiver circuitry using a wireless local area network (WLAN) protocol to the at least one mobile terminal within the service area supported by the wireless access point without specifying single or multi-point destinations for the broadcast transmissions;
      generate an invitation for delivery of the streaming media through an upstream transceiver onto a wired network to a remote access point for transmission by the remote access point to another mobile terminal attached to the remote access point in another service area supported by the remote wireless access point; and
      when a request is received for the streaming media from the another mobile terminal within the another service area supported by the remote wireless access point, the wireless access point is configured to broadcast transmit at an increased power level the streaming media from the wireless transceiver circuitry using the WLAN protocol to the another service area supported by the remote wireless access point without specifying single or multi-point destinations for the broadcast transmissions.

2. The wireless access point of claim 1 wherein the wireless access point is configured to initially establish point-to-point communications with the at least one wireless terminal within the service area of the wireless access point to provide access control information to enable the wireless terminal to receive and process the broadcast transmissions of the broadcasted streaming media.

3. The wireless access point of claim 1 wherein the wireless access point is further configured to generate an invitation to receive the broadcast media over established point-to-point communication channels to the at least one mobile terminal within the service area supported by the wireless access point.

4. The wireless access point of claim 1 wherein the wireless access point is configured to generate invitations directly through attached point-to-point communication links by way of the wireless transceiver within the service area of the access point and also within a super service area of the wireless access point through broadcast transmissions, and through a wired network by way of a network transceiver and is further configured to receive replies originated from mobile terminals in response to the invitations.

5. The wireless access point of claim 4 wherein the wireless access point broadcast transmits the streaming media at an increased power level that overlaps at least one service area of the remote wireless access point whereby the service area for the streaming media is a super area that encompasses neighboring wireless access point service coverage areas for point-to-point communications.

6. The wireless access point of claim 1 wherein the wireless access point comprises a plurality of wireless transceivers and further wherein one of the plurality of wireless transceivers is dedicated for broadcast transmissions of streaming media.

7. The wireless access point of claim 1 wherein the wireless access point is configured to generate communication signals to specified mobile terminals over point-to-point communications to provide access control information in order to prevent unauthorized access to the streaming media and further wherein the wireless access point broadcast transmits encrypted streaming media.

8. The wireless access point of claim 1 wherein the wireless access point monitors what wireless terminals requested access to the transmitted streaming media and generates corresponding billing information.

9. A method for wirelessly delivering streaming media content from a wireless access point, comprising:
   retrieving stored media content from attached storage;
   when a request is received for the media content from at least one mobile terminal within a service area supported by the wireless access point, broadcast transmitting the media content using a wireless local area network (WLAN) protocol as streaming media without specifying single or multi-point destinations for the broadcast transmissions wherein the broadcast transmissions may be received by any wireless mobile terminal within the service area of the wireless access point;
   transmitting an invitation for delivery of the streaming media through an upstream transceiver onto a wired network to a remote access point for transmission by the remote access point in another service area supported by the remote wireless access point to another mobile terminal attached to the remote access point;
   and
   when a request is received for the media content from the another mobile terminal within the another service area supported by the remote wireless access point, broadcast transmitting the media content using the WLAN protocol as streaming media at an increased power level to a super service area that overlaps at least the another service area supported by the remote wireless access point.

10. The method of claim 9 further including broadcast transmitting the streaming media over a plurality of wireless communication channels and corresponding antennas.

11. The method of claim 10 including transmitting streaming media utilizing multiple-in multiple-out (MIMO) based transmissions from a MIMO compatible down stream transceiver.

12. The method of claim 9 further including initially establishing point-to-point communications with the at least one wireless mobile terminal within the service area supported by the wireless access point to provide access control information to enable the at least one wireless mobile terminal to receive and process the broadcast transmissions of streaming media, which access control information includes information for subsequently decrypting at least one broadcast transmission of the streaming media.

13. The method of claim 9 further including transmitting the streaming media on dedicated channels or bands at the increased power level to the super service area that overlaps at least the another service area supported by the remote wireless access point.

14. A wireless access point, comprising:
at least one transceiver configured to:
establish wireless point to point communications with one or more mobile terminals within a service area;
receive a request for streaming media from at least one of the mobile terminals within the service area;
in response to the request, broadcast transmit the streaming media within the service area using a wireless local area network (WLAN) protocol;
transmit an invitation for delivery of the streaming media onto a wired network to a remote access point for transmission by the remote access point in another service area supported by the remote wireless access point to at least another mobile terminal attached to the remote access point;
receive a request for the streaming media from the at least another mobile terminal within the another service area, wherein the remote access point is configured to establish point to point communications to the another mobile terminal in the another service area; and
broadcast transmit at an increased power level the streaming media to the another service area using the WLAN protocol.

15. The wireless access point of claim 14, wherein the transceiver is configured to broadcast transmit the streaming media within the service area without specifying single or multi-point destinations.

16. The wireless access point of claim 14, wherein the transceiver is configured to broadcast transmit at an increased power level the streaming media to the another service area without specifying single or multi-point destinations.

17. The wireless access point of claim 14 wherein the transceiver is further configured to:
establish a point-to-point communication with the at least one of the mobile terminals within the service area to provide access control information for the broadcasted streaming media.

18. The wireless access point of claim 14 wherein the wireless access point is further configured to wirelessly transmit an invitation to receive the broadcasted streaming media to the remote-access point.

19. The wireless access point of claim 14 wherein the wireless access point is configured to:
transmit the invitation through a point-to-point communication within a super service area of the wireless access point, wherein the super service area includes the another service area.

20. The wireless access point of claim 14, wherein the at least one transceiver comprises:
a wireless transceiver configured for wireless communication; and
an upstream transceiver configured to transmit to the remote access point over the wired network.

* * * * *